(12) United States Patent
Nevin et al.

(10) Patent No.: US 8,660,741 B2
(45) Date of Patent: Feb. 25, 2014

(54) PARTICULATE FILTER ASH LOADING PREDICTION METHOD AND VEHICLE WITH SAME

(75) Inventors: Ryan Nevin, Waterloo, IA (US);
Antonio Triana, Waterloo, IA (US);
Danan Dou, Cedar Falls, IA (US);
Taner Tuken, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 791 days.

(21) Appl. No.: 12/896,102

(22) Filed: Oct. 1, 2010

(65) Prior Publication Data
US 2012/0083966 A1 Apr. 5, 2012

(51) Int. Cl.
*G01M 17/00* (2006.01)
*F01N 3/023* (2006.01)

(52) U.S. Cl.
CPC .......... *F01N 3/023* (2013.01); *F01N 2550/04* (2013.01)
USPC ........... 701/34.4; 701/29.1; 701/29.4; 60/277

(58) Field of Classification Search
USPC ............. 701/29.1–29.2, 29.4, 36, 100–102; 60/272–273, 277, 295
See application file for complete search history.

(56) References Cited

U.S. PATENT DOCUMENTS

| | | | |
|---|---|---|---|
| 6,622,480 B2 * | 9/2003 | Tashiro et al. | 60/295 |
| 7,264,642 B2 * | 9/2007 | Hamahata et al. | 55/282.3 |
| 7,404,291 B2 * | 7/2008 | Endo | 60/297 |
| 7,581,389 B2 * | 9/2009 | Crawley et al. | 60/297 |
| 7,677,032 B2 * | 3/2010 | Berryhill et al. | 60/297 |
| 8,384,396 B2 * | 2/2013 | Bromberg et al. | 324/636 |
| 8,384,397 B2 * | 2/2013 | Bromberg et al. | 324/636 |
| 2004/0065195 A1 * | 4/2004 | Gogins | 95/8 |
| 2007/0006577 A1 * | 1/2007 | Yokoyama et al. | 60/297 |
| 2007/0056270 A1 * | 3/2007 | Liimatta et al. | 60/295 |
| 2007/0251214 A1 * | 11/2007 | Nishino et al. | 60/277 |
| 2009/0031855 A1 * | 2/2009 | Ramberg et al. | 75/330 |
| 2010/0043408 A1 * | 2/2010 | Girot et al. | 60/287 |
| 2010/0101409 A1 * | 4/2010 | Bromberg et al. | 95/8 |
| 2010/0122522 A1 * | 5/2010 | Tsukada et al. | 60/284 |
| 2012/0083967 A1 * | 4/2012 | Nevin et al. | 701/29.4 |
| 2012/0083990 A1 * | 4/2012 | Nevin et al. | 701/102 |
| 2013/0046424 A1 * | 2/2013 | Gallagher et al. | 701/19 |

FOREIGN PATENT DOCUMENTS

| | | | | |
|---|---|---|---|---|
| JP | 10077826 A | * | 3/1998 | |
| JP | 10077827 A | * | 3/1998 | ............... F01N 3/02 |

* cited by examiner

*Primary Examiner* — John Q Nguyen
*Assistant Examiner* — Michael Ng
(74) *Attorney, Agent, or Firm* — Quarles & Brady LLP

(57) ABSTRACT

A particulate filter ash loading prediction method including the steps of determining a maximum average lifetime for the particulate filter; performing a calculation of a running average of time between regenerations of the particulate filter; calculating an end-of-service-life ratio of the particulate filter dependent upon the maximum average lifetime and the running average; and comparing the end-of-service-life ratio to a predetermined minimum end-of-service-life ratio. If the end-of-service-life ratio is equal to or less than the minimum end-of-service-life ratio then indicating that at least one of service and replacement of the particulate filter is needed due to ash loading.

23 Claims, 5 Drawing Sheets

PARTICULATE FILTER ASH LOADING PREDICTION METHOD AND VEHICLE WITH SAME

FIELD OF THE INVENTION

The present invention relates to the field of internal combustion engines, and, more particularly, to internal combustion engines having exhaust aftertreatment devices.

BACKGROUND OF THE INVENTION

Internal combustion engines come in a number of forms, the most common of which are spark-ignited gasoline fueled engines and compression-ignition, diesel-fueled engines. The compression-ignition, or diesel-type engine is used in many commercial and industrial power applications because its durability and fuel economy are superior to the spark-ignited gasoline-fueled engines. A diesel engine utilizes the heat of the compression of the intake air, into which a timed and metered quantity of fuel is injected, to produce combustion. The nature of the diesel engine cycle is that it has a variable air-fuel ratio that can, under partial power conditions, rise to levels significantly above stoichiometric. This results in enhanced fuel economy since only the quantity of fuel needed for a particular power level is supplied to the engine.

One of the issues with a diesel-type engine is the impact on emissions. In addition to the generation of carbon monoxide and nitrous oxide, there is a generation of particulates in the form of soot. A number of approaches are employed to reduce particulates while, at the same time, reducing oxides of nitrogen to ever more stringent levels as mandated by government regulations. Stoichiometric engines have been proposed to achieve this balance since they enable the use of an automotive type catalyst to reduce oxides of nitrogen. By operating the engine at or near stoichiometric conditions, a three-way catalyst may be utilized. However, operation in this manner causes a substantial increase in diesel particulates. Accordingly, a particulate filter (PF) in the form of a diesel particulate filter (DPF) must be employed to filter out the particulates, but the generation of particulates in a significant amount require that frequent regeneration of the filters, through temporary heating or other means, is necessary to remove the collected particulate matter. A wall-flow DPF will often remove 85% or more of the soot during operation. Cleaning the DPF includes utilizing a method to burn off the accumulated particulate either through the use of a catalyst or through an active technology, such as a fuel-burner, which heats the DPF to a level in which the soot will combust. This may be accomplished by an engine modification which causes the exhaust gasses to rise to the appropriate temperature. This, or other methods, known as filter regeneration, is utilized repeatedly over the life of the filter. One item that limits the life of the DPF is an accumulation of ash therein that will cause the filter to require replacement or some other servicing, such as a cleaning method, to remove the accumulated ash. The accumulated ash causes a reduction in the efficiency of the DPF and causes increased back pressure in the exhaust system of the diesel engine system.

U.S. Patent Application Pub. No. US 2007/0251214 discloses an apparatus for detecting a state of a DPF with a differential pressure sensor. An electronic control unit estimates an amount of ash remaining in the DPF based on the output of the differential pressure sensor immediately after the regeneration process. Alternatively, the residue ash amount may be calculated based on the difference between a ratio of the variation rate of the input manifold pressure with the variation rate of the differential pressure immediately after the regeneration process and an equivalent ratio regarding a thoroughly new or almost new diesel particulate filter. The residue ash amount is calculated every time a regeneration process is carried out and stored in memory. This method is problematic since the backpressure assessment after regeneration can be misleading if the soot has not been entirely removed and since the backpressure due to the ash accumulation measured after each regeneration can vary leading to misleading assumptions about the ash content.

U.S. Pat. No. 6,622,480 discloses a DPF unit and regeneration control method that adjusts the start timing of a regeneration operation. The method includes an estimate of the ash accumulated quantity that is in the exhaust gas and accumulated in the filter and the correction of the exhaust pressure judgment value for judging the regeneration operation start based on the ash accumulated estimation value. The ash quantity is determined from the quantity of lubricant oil consumed according to the engine operation state. The effective accumulation in the filter with ash is reflected in the judgment of regeneration start timing because the exhaust pressure judgment value to be used for judging the regeneration operation start is corrected with the ash accumulation estimation value. The use of oil consumption is problematic since the lubricant oil may be consumed in ways other than being combusted. Further, even if the oil is not combusted, it is not necessarily passed through the DPF.

It is also possible that direct-injected gasoline engines may require the use of a PF in the future, as a result of ever increasing governmental emissions standards.

What is needed in the art is a system that maximizes the life of a PF, such as a DPF, while ensuring that the regeneration process is done in an efficient, economical manner.

SUMMARY

In one form, the invention includes a particulate filter ash loading prediction method including the steps of determining a maximum average lifetime for the particulate filter; performing a calculation of a running average of time between regenerations of the particulate filter; calculating an end-of-service-life ratio of the particulate filter dependent upon the maximum average lifetime and the running average; and comparing the end-of-service-life ratio to a predetermined minimum end-of-service-life ratio. If the end-of-service-life ratio is equal to or less than the minimum end-of-service-life ratio then indicating that at least one of service and replacement of the particulate filter is needed due to ash loading.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION

Figure 1:
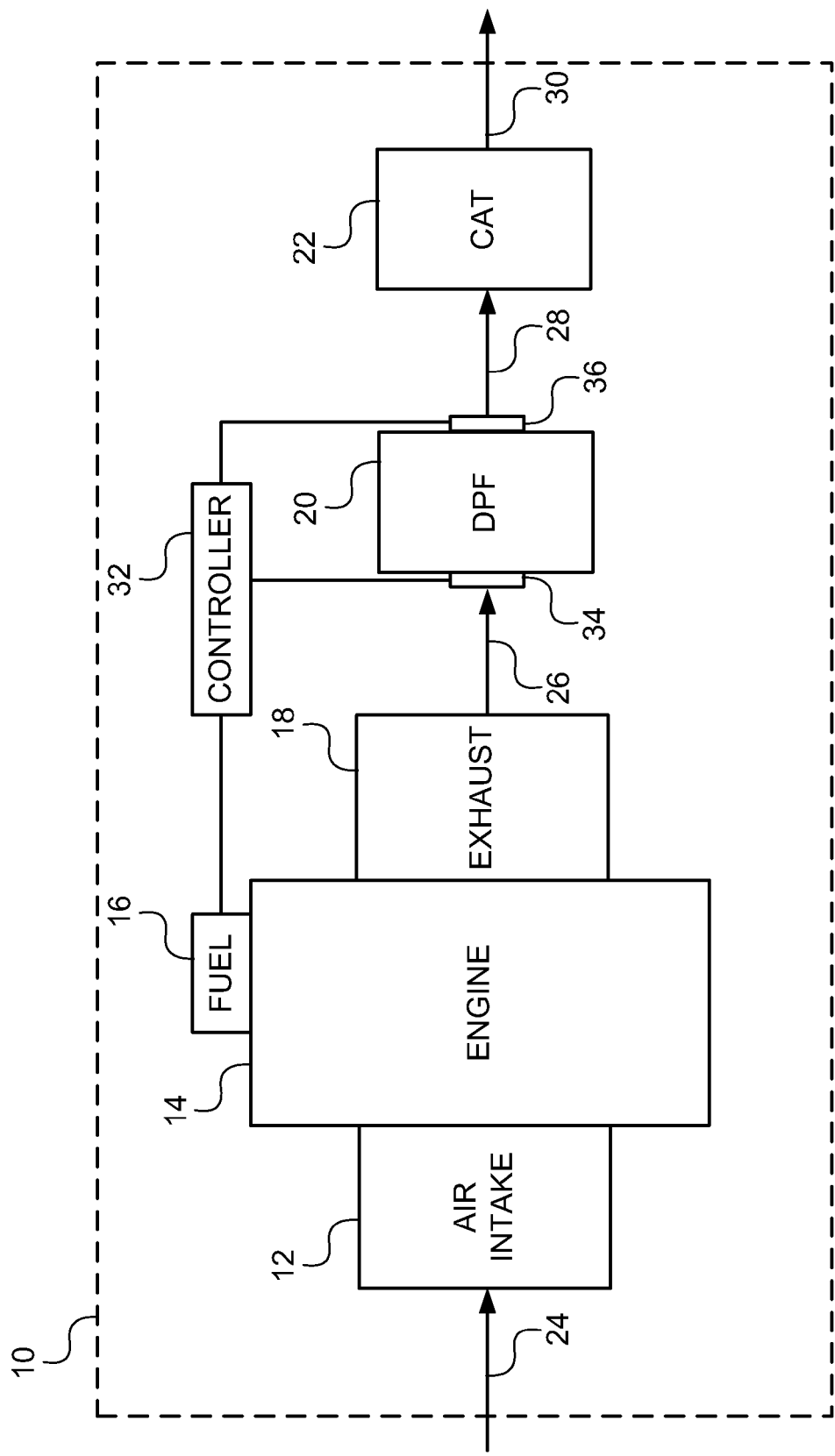
FIG. 1 is a schematic drawing of a vehicle with an internal combustion engine employing an embodiment of an ash loading prediction method of the present invention.

Referring now to the drawings, and more particularly to FIG. 1, there is shown a vehicle 10, which may be an agricultural work vehicle, a forestry work vehicle or a construction type vehicle utilizing an engine system that includes an air intake 12, an engine 14, a fuel supply system 16 (labeled FUEL in FIG. 1), and an exhaust system 18 (labeled EXHAUST in FIG. 1). Engine 14 has at least one piston reciprocating within an engine block that is connected to a crankshaft for producing a rotary output (not shown). Each piston is movable within a variable volume combustion chamber that receives air for combustion from air intake 12 and fuel from fuel supply system 16. The products of combustion pass through exhaust system 18.

The engine system additionally includes a diesel particulate filter (DPF) 20 (labeled DPF in FIG. 1) and a catalyst 22 (labeled CAT in FIG. 1). Although the embodiment of the invention illustrated in the drawings and described herein is with reference to a diesel engine having a DPF, it is understood that the present invention can likewise apply to other types of engines using a PF, such as a direct-injected gasoline engine, etc. An air intake flow 24 passes into engine 14 for the purposes of combustion, having an exhaust flow 26 that passes through DPF 20 and a gas flow 28 that continues through catalyst 22 and is exhausted in the form of gas flow 30 to the environment. DPF 20 and catalyst 22 may be combined into one unit or catalyst 22 may be positioned at a different location or omitted from the engine system. A controller 32 interacts with sensors 34 and 36 as well as fuel supply system 16 to control the flow of fuel and to sense the pressure drop across DPF 20. DPF 20 may be regenerated as directed by controller 32 with input of the sensors 34 and 36, each of which provide pressure readings so that the pressure drop across DPF 20 can be calculated by controller 32 based on the difference in pressure measurements between sensors 34 and 36. Controller 32 provides input to fuel supply system 16, which may cause engine 14 to change the exhaust temperature flowing through exhaust system 18 to DPF 20, causing a regeneration of DPF 20.

Figure 2:
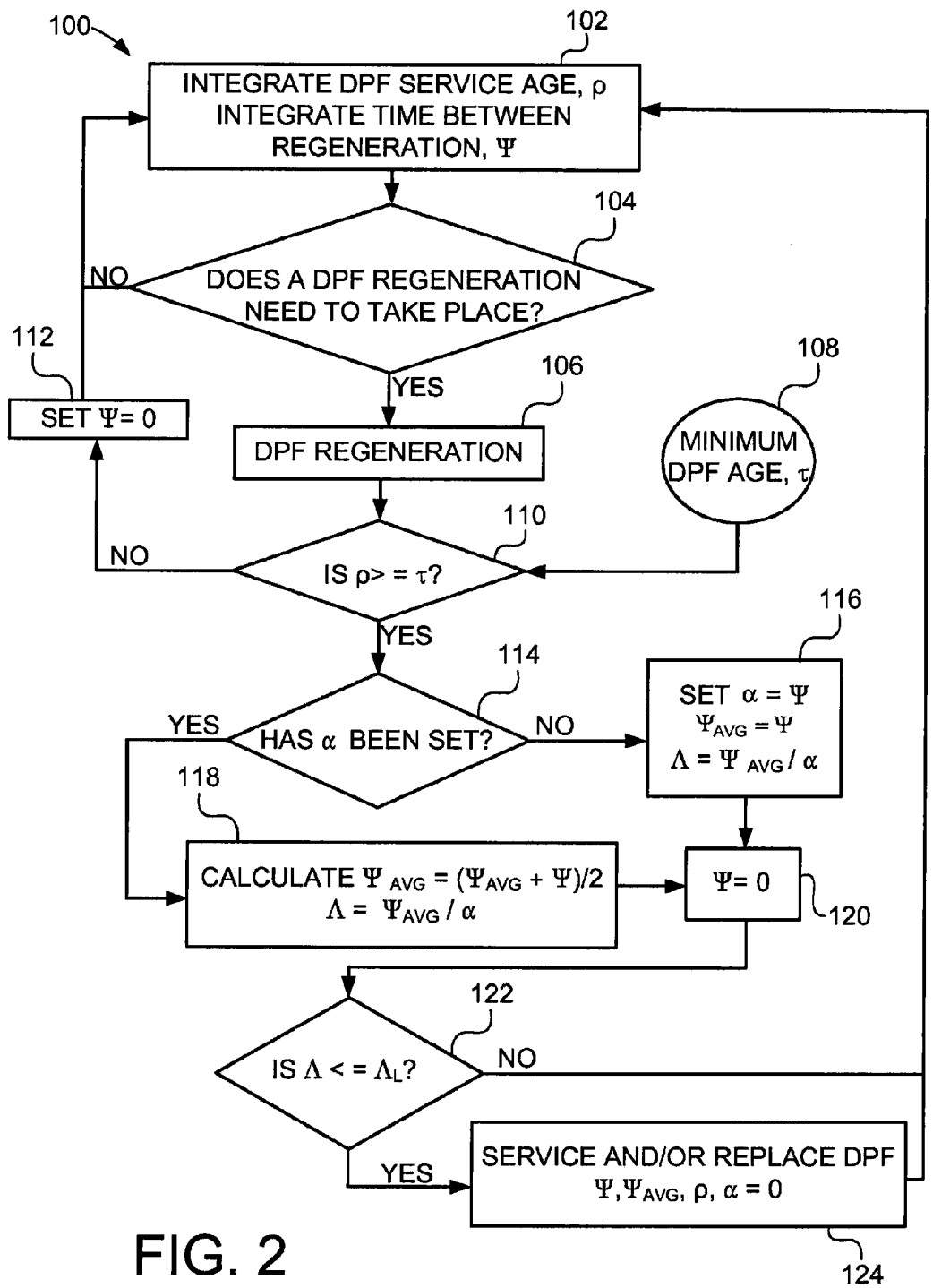
FIG. 2 depicts a schematical representation of a method utilized in the vehicle of FIG. 1.

Now, additionally referring to FIG. 2, there is shown an ash loading prediction method 100 utilized within controller 32, which may be interconnected to other sensors and control systems. Controller 32 may have other functions unrelated or indirectly related to the functions of method 100 of the present invention. Method 100 includes a step 102 in which the DPF service age $\rho$, as well as the time between regenerations $\psi$ are separately integrated by a process of integration or summing. This summing of the DPF service age $\rho$ and this step also keeps track of the time between regenerations $\psi$. At step 104, a decision is made as to whether DPF 20 requires a regeneration. This may be decided upon the delta pressure across DPF 20 as sensed by sensors 34 and 36 under the control of controller 32 and upon other portions of method 100, such as the compensation for the ash loading that is occurring in DPF 20. With the ash loading prediction being made by the present invention, then the contribution of backpressure in DPF 20 that is attributed to the particulate matter that is to be cleaned from DPF 20 can be accurately assessed to determine if it is time for a regeneration of DPF 20 to take place. If no regeneration is needed, step 104 proceeds back to step 102 but the time continues to be tracked for the DPF service age $\rho$ and the time between regenerations $\psi$. If a DPF regeneration needs to take place as decided at step 104, method 100 proceeds to step 106 in which a DPF regeneration cycle is initiated and takes place.

A predetermined minimum DPF age $\tau$, schematically shown as step 108 is used in step 110 to compare to the DPF service age $\rho$ to see if $\rho$ is greater than or equal to $\tau$. If the integrated DPF service age $\rho$ is not greater than or equal to the minimum DPF age $\tau$, then method 100 resets the time between regenerations $\psi$ to be equal to zero, at step 112 so that it will then start re-accumulating time at step 102. This portion of method of 100 ensures that at least a minimum age for DPF 20 is realized before establishing a service life for DPF 20. In the event that the DPF service age $\rho$ exceeds or is equal to the minimum DPF age $\tau$, method 100 proceeds to step 114 to determine if a maximum average time $\alpha$ has been set. If the answer is no, then the maximum average time is set to the most recent time between regenerations $\psi$ and $\psi_{AVG}$ is also set equal to $\psi$, at step 116. If the maximum average time $\alpha$ has been previously set, then method 100 proceeds from step 114 to step 118 in which the running average of the time between regeneration is calculated by the equation of $\psi_{AVG}$ being set equal to $(\psi_{AVG}+\psi)/2$. Then, an end-of-service Life ratio $\Lambda$ is set equal to the running average of time between regenerations $\psi_{AVG}$ divided by the maximum average time $\alpha$ and the time between regenerations $\psi$ is set to zero, at step 120. Method 100 then proceeds to step 122, in which it is determined whether the end-of-service life ratio $\Lambda$ is less than or equal to the end-of-service life ratio maximum $\Lambda_L$. If the answer is no, then method 100 proceeds to step 102. If the end-of-service life ratio $\Lambda$ is less than or equal to end-of-service life ratio maximum $\Lambda_L$, then method 100 proceeds to step 124 in which an indication is made that service or the replacement of the DPF 20 is necessary. The indication may be in the form of an illuminated warning light on a console supervised by an operator or some other form of communication of the information to the operator of vehicle 10 or to maintenance personnel. Additionally, at step 124, when the service or replacement of DPF 20 takes place, variables are set to zero such as $\psi$, $\psi_{AVG}$, $\rho$, $\tau$, $\Lambda$.

Figure 3A:
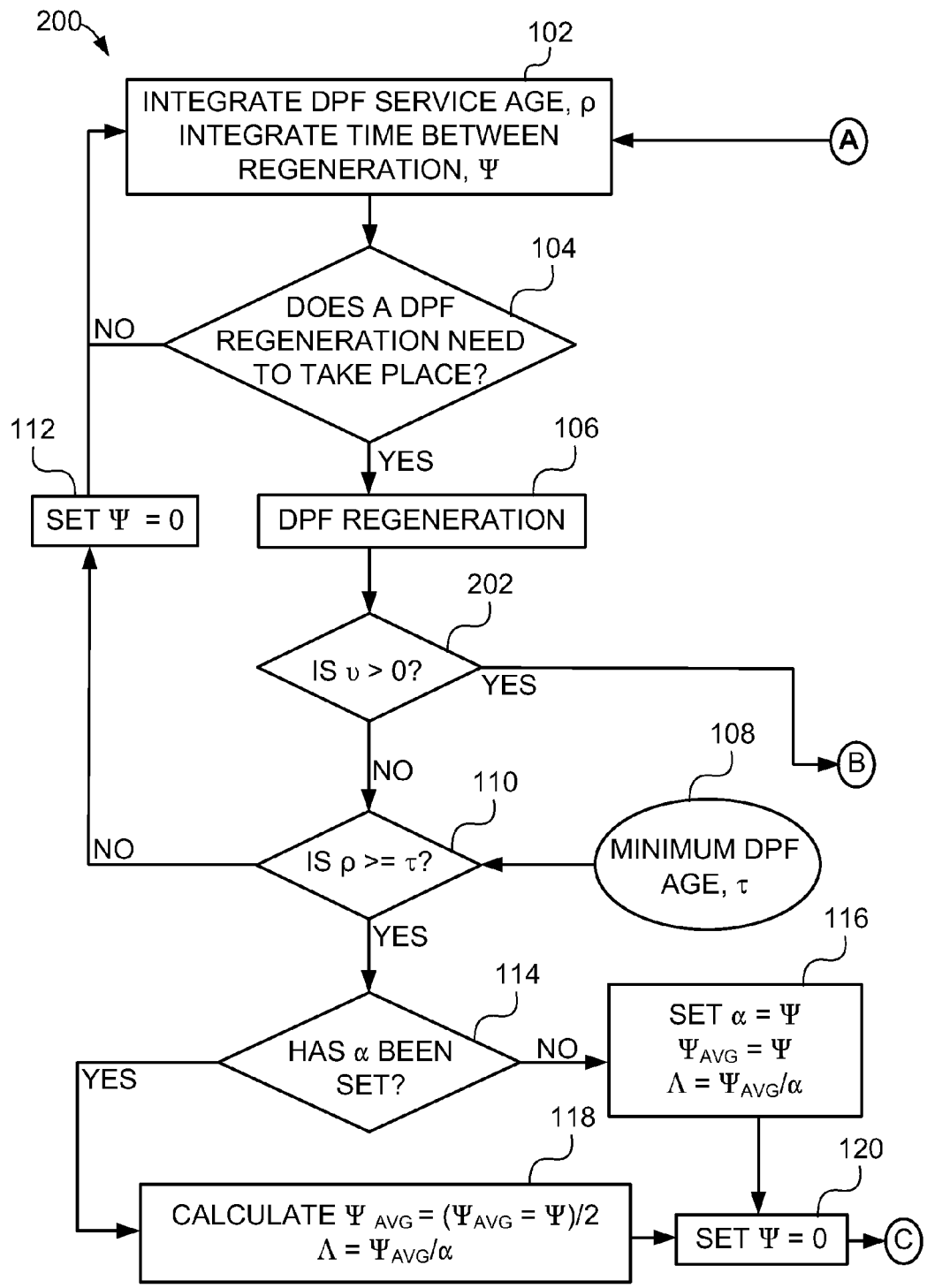
FIGS. 3A, 3B and 3C are schematical representations of two variations of another embodiment of the method utilized in the vehicle of FIG. 1.
Figure 3B:
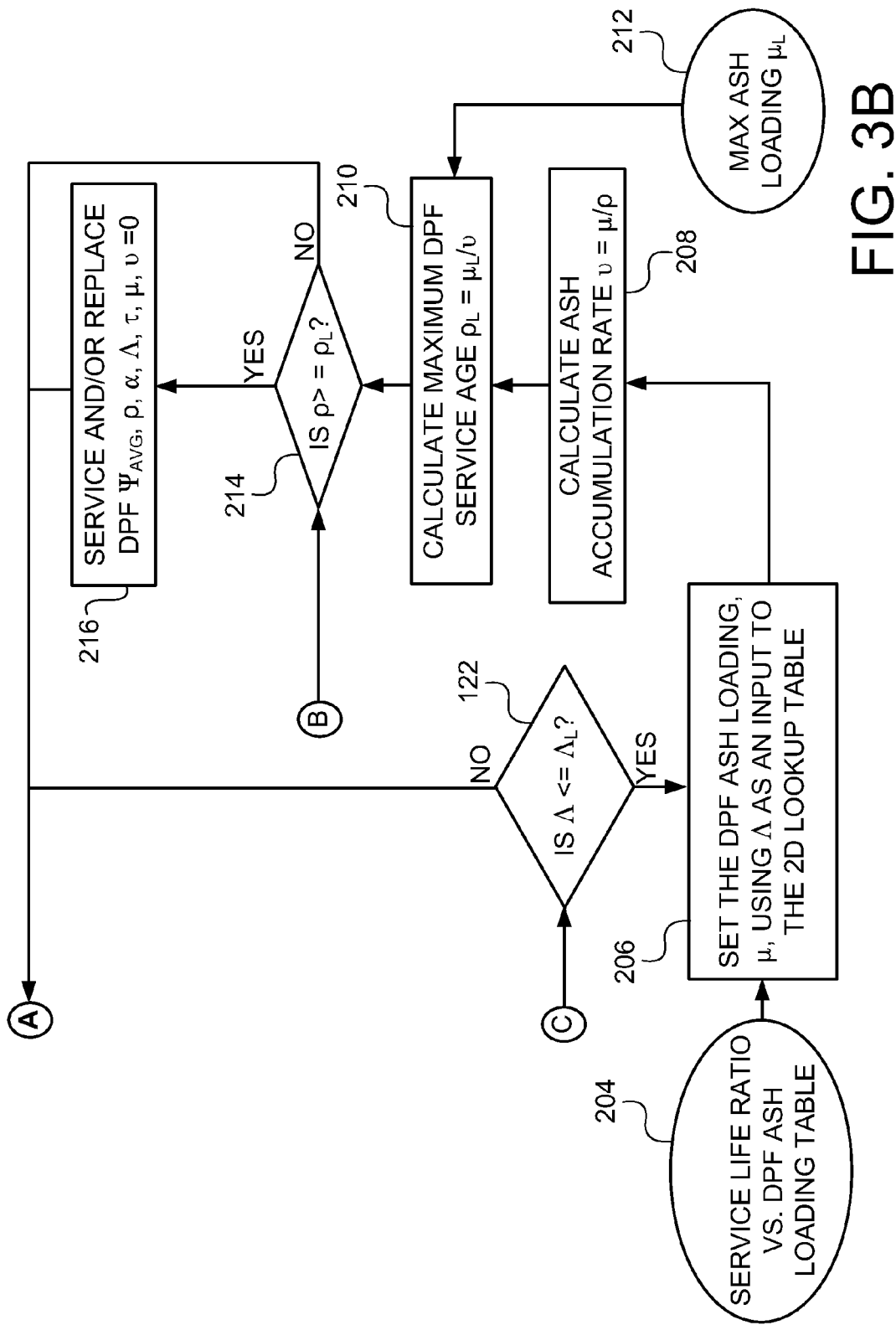
Figure 3C:
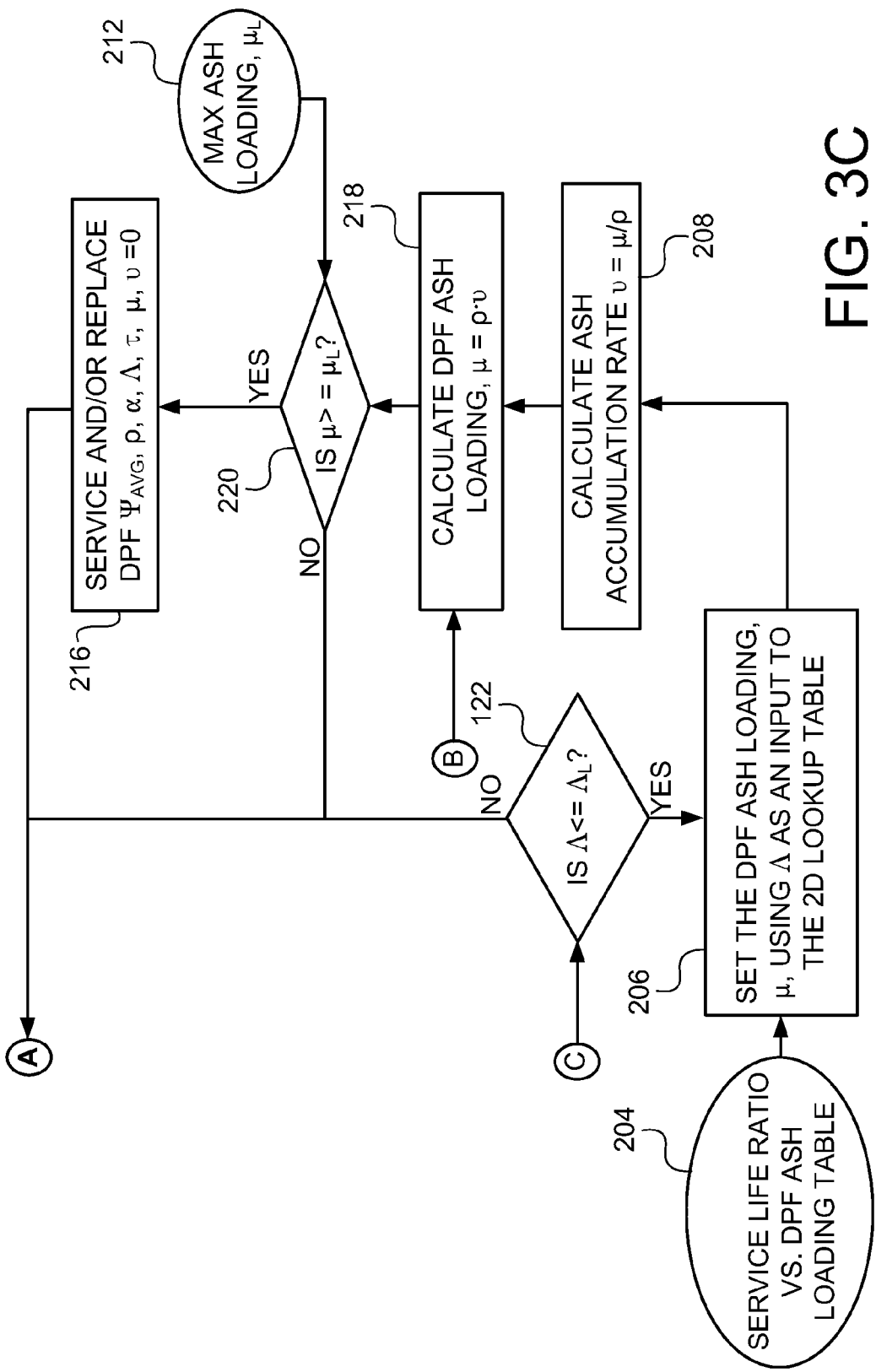

Now, additionally referring to FIGS. 3A, 3B, and 3C, there is shown another embodiment of the ash loading prediction method described above. Method 200 has two variations, which are further explained in FIGS. 3B and 3C. The variations of method 200 are to be understood to be illustrated in the differences in FIGS. 3B and 3C. The first variation of method 200 utilizes FIGS. 3A and 3B and the second variation of method 200 utilizes FIGS. 3A and 3C. Steps that are similar between method 100 and 200 retain the same numbers from method 100 and perform the functions as discussed above.

Now, considering the first variation of method 200 in FIG. 3A, if DPF 20 regeneration takes place at step 106, then, at step 202, it is determined whether the ash accumulation rate $\upsilon$ is greater than zero. If the ash accumulation rate $\upsilon$ is not greater than zero, then method 200 proceeds to step 110. If the ash accumulation rate $\upsilon$ is greater than zero at step 202, then method 200 proceeds to step 214 and bypasses several steps, since the ash accumulation rate $\upsilon$ has been established.

If the end-of-service-life ratio $\Lambda$ is less than or equal to the end-of-service-life ratio $\Lambda_L$, then method 200 proceeds to step 206. In the event that end-of-service-life ratio $\Lambda$ is not equal to or less than the end-of-service-life ratio maximum $\Lambda_L$, then method 200 proceeds to step 102. At step 206, DPF 20 ash loading value $\mu$ is set by utilizing the service life ratio versus DPF ash loading table depicted in step 204 to thereby determine the ash loading value $\mu$. Once the ash loading value $\mu$ is established, method 200 proceeds to step 208 in which the ash accumulation rate $\upsilon$ is calculated by setting it equal to the ash loading value $\mu$ divided by the service age $\rho$ value. At step 210, the maximum DPF service age $\rho_L$ is calculated by setting it equal to the maximum ash loading value $\mu_L$ depicted in step 212, which is a predetermined value, divided by the ash accumulation rate $\upsilon$.

At step 214, the DPF service age $\rho$ is compared to the maximum DPF service age $\rho_L$. If the DPF service age $\rho$ is greater than or equal to the maximum DPF service age $\rho_L$, then method 200 proceeds to step 216. If the DPF service age $\rho$ is not greater than or equal to the maximum DPF service age $\rho_L$, then method 200 proceeds to step 102. At step 214, an indication is provided to the operator of vehicle 10 or maintenance personnel of vehicle 10 that servicing and/or replacement of DPF 20 is necessary. The indication may be in the form of an illuminated warning light on a console supervised by the operator or some other form of communication of the information to the operator of vehicle 10 or to the maintenance personnel. Additionally, at step 216, when the service or replacement of DPF 20 takes place, variables are set to zero, such as $\psi_{AVG}$, $\rho$, $\alpha$, $\Lambda$, $\tau$, $\mu$, $\upsilon$.

Now, discussing a second variation of method 200, and, more particularly, referring to FIGS. 3A and 3C, steps 218 and 220 have been incorporated and steps 210 and 214 are eliminated. Step 218 is undertaken upon the completion of step 208 or upon the affirmative answer of the test at step 202. At step 218, the DPF 20 ash loading value $\mu$ is calculated by setting it equal to the DPF service age $\rho$ times the ash accumulation rate $\upsilon$. Then, at step 220, the comparison is undertaken to see if the ash loading value $\mu$ is greater than or equal to maximum ash loading value $\mu_L$ obtained as a predetermined value, as illustrated in step 212. If the ash loading value $\mu$ is greater than or equal to the maximum ash loading value $\mu_L$, then method 200 proceeds to step 216 in which the DPF 20 is serviced and/or replaced. If the DPF ash loading value $\mu$ is not greater than or equal to the maximum ash loading value $\mu_L$, then method 200 proceeds back to step 102.

DPF 20 may be in the form of a wall-flow filter that traps soot with a very high efficiency, even above 90%. When the soot cake layer has been established within DPF 20, filling the inlet channel walls, the pressure increases across DPF 20 and a soot trapping efficiency of higher than 99% may be achieved. It is common to measure a pressure drop across DPF 20 through the use of a delta pressure sensor, which may include two sensors, such as those illustrated in FIG. 1 as sensors 34 and 36. The readings from sensors 34 and 36 are used to predict DPF 20 soot loading.

A high filtration efficiency DPF 20 also traps ash, which can come from high ash lube oil, excessive oil consumption, and high ash fuels, such as biodiesel. As ash gradually accumulates in DPF 20, the DPF 20 delta pressure signal received by controller 32 at a given soot level will be higher. This behavior is due to ash occupying space in the inlet channels of DPF 20, leaving less surface/volume for soot distribution.

Overall, ash accumulation is generally a slow process. Total exhaust system back pressure due to ash starts to become noticeable above 2,500 hours of engine operation for greater than 130 kilowatt applications, and above 1,500 hours of operation for less than 130 kilowatt applications. However, in addition to the effect on engine performance due to higher back pressure, the delta pressure sensor readings increase as a result of the ash loading. Without any compensation for ash loading, the time interval between regenerations starts to decrease since the aftertreatment control system will determine that a DPF 20 regeneration needs to occur based on delta pressure readings.

It is known that ash loading of DPF 20 will cause higher delta pressure readings across DPF 20 to become progressively higher with soot loading and that such effects cannot be remedied by merely averaging. Also, ash accumulation can take a significant amount of engine operation time to show substantial effects on DPF delta pressure signals and exhaust back pressures.

Methods 100 and 200 deal with ash that is accumulated in DPF 20 with time, and recognizes the normalized delta pressure readings will tend to increase, leading to more frequent regenerations. The increase in the number of regenerations can be tied in direct proportion to the overall average time between regenerations. The maximum average time $\alpha$ is calculated early on in engine and aftertreatment service life. Although it can be calculated from the first several samples of time between regenerations, waiting for DPF age $\rho$ to pass a minimum DPF age $\tau$ allows there to be ample time for the maximum average time $\alpha$ to be established and thereby avoid a possible over calculation of the maximum average time between regenerations.

After the maximum average time $\alpha$ is calculated, it will be continuously referenced to calculate the end-of-service life ratio $\Lambda$ using the ongoing calculation of the running average of time between regenerations $\psi_{AVG}$. As DPF 20 loads with ash and the regeneration frequency increases, $\Lambda$ decreases from 1.0. However, as ash accumulates in DPF 20, the normalized and non-normalized delta pressure will trend at higher levels for the same soot loading than if there was no ash present in DPF 20.

From experimental testing, it has been found that the end-of-service life ratio $\Lambda$ can be used as an input to an ash loading table to determine the ash loading value $\mu$. The ash loading value $\mu$ is then used to calculate the ash accumulation rate $\upsilon$. Either the DPF service age $\rho$ is used as the test, as in FIG. 3B, or the ash loading value $\mu$ is used as the test, as in FIG. 3C to determine if it is time to service and/or replace DPF 20, at step 216.

Advantageously, the present invention provides a statistically based ash model to monitor and verify the ash prediction that is not based on operation hours or fuel consumption history, as utilized in prior art systems. Further, the method is also capable of flagging excessive oil consumption or poor fuel quality that results in excessive loading of DPF 20. Additionally, the present invention reduces the number of DPF regenerations when the DPF 20 is approaching the end-of-service life. The method can also generate an input for a monitor after determining that an ash service warning or engine degradation is occurring or may occur. Yet further, the present invention can compensate for the use of biodiesel, which has a tendency to create additional ash over petroleum based diesel.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:
1. A particulate filter ash loading prediction method, comprising the steps of:
    determining a service age of the particulate filter;
    comparing said service age to a predetermined minimum service age;

determining, after said service age has reached said predetermined minimum service age, a running average of time between regenerations of the particulate filter;

calculating an end-of-service-life value of the particulate filter dependent, at least in part, upon said running average; and comparing said end-of-service-life value to a predetermined minimum end-of-service-life value, if said end-of-service-life value is one of equal to and less than said minimum end-of-service-life value then indicating that at least one of service and replacement of the particulate filter is needed due to ash loading.

2. The ash loading prediction method of claim 1, further comprising a step of determining, after said service age has reached said predetermined minimum service age, a maximum average time between regenerations of the particulate filter.

3. The ash loading prediction method of claim 2, wherein said end-of-service-life value is a ratio of said running average to said maximum average time.

4. The ash loading prediction method of claim 3, wherein once determined said maximum average time is held constant in the calculation of said end-of-service-life ratio at least until the particulate filter is one of serviced and replaced.

5. The ash loading prediction method of claim 2, wherein the step of comparing said service age to said predetermined minimum service age further comprises:
   determining said service age has reached said predetermined minimum service age; and
   setting said the maximum average time equal to a current time between filter regenerations.

6. The ash loading prediction method of claim 1, further comprising a step of regenerating the particulate filter dependent upon a delta pressure measurement across the particulate filter.

7. The ash loading prediction method of claim 1, wherein said service age is determined by integrating a time of use of the particulate filter, and wherein said running average is determined by integrating and averaging the time between filter regenerations.

8. A particulate filter ash loading prediction method, comprising the steps of:
   determining a service age of the particulate filter;
   comparing said service age to a predetermined minimum service age;
   determining, after said service age has reached said predetermined minimum service age, a running average of time between regenerations of the particulate filter;
   calculating an end-of-service-life value of the particulate filter dependent, at least in part, upon said running average; and
   comparing said end-of-service-life value to a predetermined minimum end-of-service-life value, if said end-of-service-life value is one of equal to and less than said minimum end-of-service-life value then setting an ash loading value dependent upon said end-of-service-life value.

9. The ash loading prediction method of claim 8, wherein said service age is determined by integrating a time of use of the particulate filter, and wherein said running average is determined by integrating and averaging the time between filter regenerations.

10. The ash loading prediction method of claim 9, further comprising the step of calculating an ash accumulation rate from said ash loading value and said service age.

11. The ash loading prediction method of claim 10, further comprising the steps of:
   calculating said ash loading value dependent upon said ash accumulation rate and said service age; and
   skipping said comparing step and said calculating an ash accumulation rate once said ash accumulation rate has a value greater than zero.

12. The ash loading prediction method of claim 11, further comprising the step of comparing said ash loading value with a predetermined maximum ash loading value, if said ash loading value is one of equal to and greater than said maximum ash loading value then indicating that at least one of service and replacement of the particulate filter is needed due to ash loading.

13. The ash loading prediction method of claim 10, further comprising the step of calculating a particulate filter maximum service age dependant upon said ash accumulation rate and a predetermined maximum ash loading value.

14. The ash loading prediction method of claim 13, further comprising the step of comparing said service age with said maximum service age, if said service age is one of equal to and greater than said maximum service age then indicating that at least one of service and replacement of the particulate filter is needed due to ash loading.

15. The ash loading prediction method of claim 8, further comprising a step of regenerating the particulate filter dependent upon a delta pressure measurement across the particulate filter.

16. The ash loading prediction method of claim 8, further comprising a step of determining, after said service age has reached said predetermined minimum service age, a maximum average time between regenerations of the particulate filter.

17. A vehicle, comprising:
   an internal combustion engine;
   a particulate filter connected to said internal combustion engine;
   a controller operatively connected to said internal combustion engine and to said particulate filter, said controller being configured to execute the steps of a method, the method including the steps of:
   determining a service age of the particulate filter;
   comparing said service age to a predetermined minimum service age;
   determining, after said service age has reached said predetermined minimum service age, a running average of time between regenerations of the particulate filter;
   calculating an end-of-service-life value of the particulate filter dependent, at least in part, upon said running average; and
   comparing said end-of-service-life value to a predetermined minimum end-of-service-life value, if said end-of-service-life value is one of equal to and less than said minimum end-of-service-life value then setting an ash loading value dependent upon said end-of-service-life value.

18. The vehicle of claim 17, wherein said running average is determined by integrating and averaging the time between filter regenerations and, wherein said service age is determined by integrating a time of use of the particulate filter.

19. The vehicle of claim 18, wherein the method further includes a step of calculating an ash accumulation rate from said ash loading value and said service age.

20. The vehicle of claim 19, wherein the method further includes a steps of:
   calculating said ash loading value dependent upon said ash accumulation rate and said service age; and skipping said comparing step and said calculating an ash accumulation rate once said ash accumulation rate has a value greater than zero.

21. The vehicle of claim 19, wherein the method further includes a step of calculating a particulate filter maximum service age dependant upon said ash accumulation rate and a predetermined maximum ash loading value.

22. The vehicle of claim 17, wherein the method further includes a step of regenerating the particulate filter dependent upon a delta pressure measurement across the particulate filter.

23. The vehicle of claim 17, wherein the method further includes a step of determining, after said service age has reached said predetermined minimum service age, a maximum average time between regenerations of the particulate filter.

\* \* \* \* \*